No. 701,451. Patented June 3, 1902.
L. D. YODER.
WEEDER.
(Application filed Oct. 19, 1901.)
(No Model.)
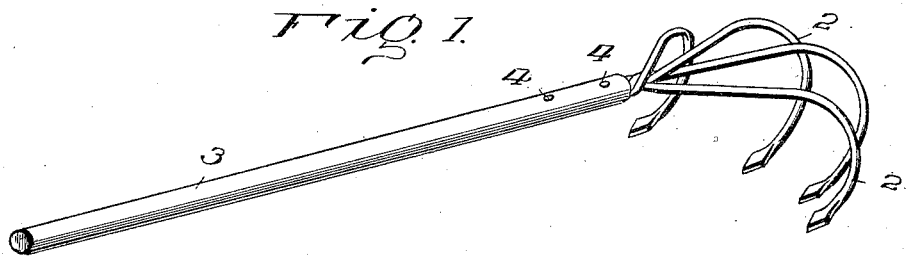
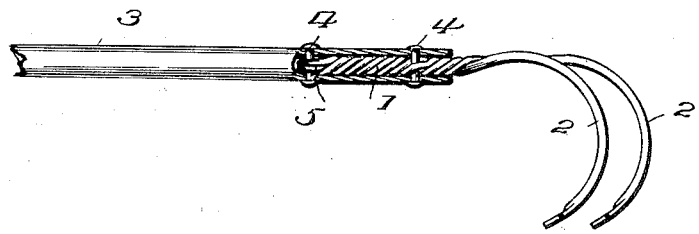
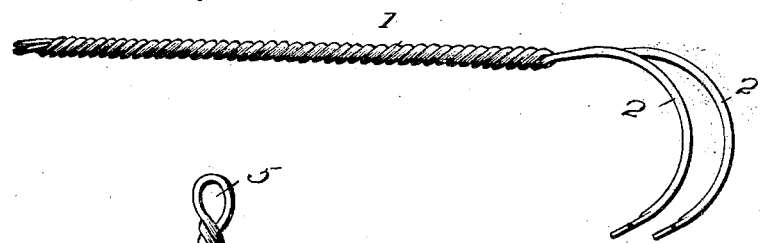
Witnesses
Inventor
L. D. Yoder.
by Attorneys

UNITED STATES PATENT OFFICE.

LEVI D. YODER, OF DUBLIN, PENNSYLVANIA.

WEEDER.

SPECIFICATION forming part of Letters Patent No. 701,451, dated June 3, 1902.

Application filed October 19, 1901. Serial No. 79,250. (No model.)

*To all whom it may concern:*

Be it known that I, LEVI D. YODER, a citizen of the United States, residing at Dublin, in the county of Bucks and State of Pennsylvania, have invented certain new and useful Improvements in Weeders; and I do hereby declare the following to be a full, clear, and exact description of the invention, such as will enable others skilled in the art to which it appertains to make and use the same.

This invention relates to garden-tools, the specific article being a weeder, and comprising a handle and a series of teeth. Simplicity of construction as well as cheapness of manufacture are essential points in devising the implement.

The improvement consists of the novel features, details of construction, and combination of parts, which hereinafter will be more fully set forth, illustrated, and finally claimed.

In the drawings forming a part of the specification, Figure 1 is a perspective view of an implement embodying the invention. Fig. 2 is a side view, the outer end of the handle being broken away and the lower end being in section. Fig. 3 is a side view of a modification in which the stem is extended, so as to form the handle. Fig. 4 is a top view of the form of weeder designed to have a handle fitted thereto.

Corresponding and like parts are referred to in the following description and indicated in all the views of the drawings by the same reference characters.

The weeder comprises a stem 1 and a series of teeth 2, the parts being formed of wire of determinate gage according to the size and purpose for which the tool or implement is designed. A series of wires have one end intertwisted to form the stem 1 and the opposite end extended to form the teeth, which are spread and curved, as indicated in the several views. Any number of wires may be employed according to the required number of teeth, and the free ends of the wires are spaced and curved rearwardly and forwardly and their extremities are flattened and pointed, so as the better to penetrate the soil and remove weeds or enable loosening of the earth about the roots of plants as required.

The stem 1 may be of such a length as to form a handle; but in some instances it may be desirable to attach a pole or stick 3 thereto to form a handle, as indicated most clearly in Figs. 1 and 2. In this construction the stem 1 is fitted into an opening or slot in the lower end of the handle 3 and is secured in place by fastenings 4, which may be rivets, screws, or pins. Eyes 5 and 6 are formed in the stem 1 to receive the fastenings 4, the eye 6 being formed by spreading adjacent twists of the wires, and the eye 5 being formed by the fold resulting from doubling one or more of the wires in the formation of the implement.

In the preferable construction the implement has an even number of teeth, usually four, and is constructed of two lengths of wire, each doubled upon itself midway of its ends, the folded portions being twisted together for a short distance from the fold or eye 5 and the end portions being spread and curved to form the teeth 2. The outermost teeth are curved, so as to come in advance of the intermediate teeth, thereby throwing the teeth out of transverse alinement, which is essential and of advantage, since it admits of the implement being used to the best possible advantage.

Having thus described the invention, what is claimed as new is—

An implement of the character described formed of a series of wires doubled upon themselves and twisted together for a short distance from the fold and having the end portions spread and bent to form teeth and having an eye at the fold and another in the length of the stem formed by spacing adjacent twists, a handle receiving the stem of the tool, and fastenings connecting the handle and stem by passing through the eyes of the latter and openings in the handle, substantially as specified.

In testimony whereof I affix my signature in presence of two witnesses.

LEVI D. YODER. [L. S.]

Witnesses:
 HARRY E. GRIM,
 GEORGE MEFER.